(12) United States Patent
Xia et al.

(10) Patent No.: US 10,783,331 B2
(45) Date of Patent: Sep. 22, 2020

(54) METHOD AND APPARATUS FOR BUILDING TEXT CLASSIFICATION MODEL, AND TEXT CLASSIFICATION METHOD AND APPARATUS

(71) Applicant: BAIDU ONLINE NETWORK TECHNOLOGY (BEIJING) CO., LTD., Beijing (CN)

(72) Inventors: Yuan Xia, Beijing (CN); Jingbo Zhou, Beijing (CN); Weishan Dong, Beijing (CN); Wei Fan, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 155 days.

(21) Appl. No.: 16/116,710

(22) Filed: Aug. 29, 2018

(65) Prior Publication Data
US 2019/0095432 A1     Mar. 28, 2019

(30) Foreign Application Priority Data
Sep. 26, 2017    (CN) .......................... 2017 1 08826850

(51) Int. Cl.
*G06F 40/44*      (2020.01)
*G06N 7/00*      (2006.01)
(Continued)

(52) U.S. Cl.
CPC ............ *G06F 40/44* (2020.01); *G06F 40/216* (2020.01); *G06F 40/30* (2020.01); *G06F 40/53* (2020.01);
(Continued)

(58) Field of Classification Search
USPC ..................................................... 704/1–504
See application file for complete search history.

(56) References Cited

U.S. PATENT DOCUMENTS 6,137,898 A * 10/2000 Broussard ................ B25J 15/04
                                                                                                  382/132
6,925,432 B2 * 8/2005 Lee ........................ G06K 9/6217
                                                                                                   704/5
(Continued)

FOREIGN PATENT DOCUMENTS

| CN | 106169075 A | 11/2016 |
| CN | 106709568 A | 5/2017 |
| CN | 107133220 A | 9/2017 |

*Primary Examiner* — Marcus T Riley
(74) *Attorney, Agent, or Firm* — Seed IP Law Group LLP (57) ABSTRACT

The present disclosure provides a method and apparatus for building a text classification model, and a text classification method and apparatus. The method of building a text classification model comprises: obtaining a training sample; obtaining a vector matrix corresponding to the text, after performing word segmentation for the text based on an entity dictionary; using the vector matrix corresponding to the text and a class of the text to train a first classification model and a second classification model respectively; during the training process, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model. The text classification method comprises: obtaining a to-be-classified text; obtaining a vector matrix corresponding to the text, after performing word segmentation for the text based on an entity dictionary; inputting the vector matrix into a text classification model, and obtaining a classification result of the text according to output of the text classification model. The text classification effect can be improved through the technical solutions of the present disclosure.

20 Claims, 4 Drawing Sheets

(51) Int. Cl.
  *G06K 9/62* (2006.01)
  *G06K 9/72* (2006.01)
  *G06F 40/30* (2020.01)
  *G06F 40/53* (2020.01)
  *G06F 40/216* (2020.01)

(52) U.S. Cl.
  CPC ........... *G06K 9/627* (2013.01); *G06K 9/6264* (2013.01); *G06K 9/6271* (2013.01); *G06K 9/723* (2013.01); *G06N 7/005* (2013.01)

(56) References Cited

U.S. PATENT DOCUMENTS

| | | | | |
|---|---|---|---|---|
| 7,707,129 B2 * | 4/2010 | Zhuang | ................ | G06K 9/6269 706/20 |
| 8,856,050 B2 * | 10/2014 | Chenthamarakshan | ..................... | G06N 20/00 706/12 |
| 8,892,488 B2 * | 11/2014 | Qi | ........................... | G06F 40/30 706/45 |
| 10,042,845 B2 * | 8/2018 | Amin | ...................... | G06F 40/58 |
| 10,268,646 B2 * | 4/2019 | Jaech | ................ | G06F 16/3326 |
| 10,296,846 B2 * | 5/2019 | Csurka | ................ | G06N 3/0454 |
| 10,360,303 B2 * | 7/2019 | Volkovs | ................ | G06F 40/30 |
| 10,540,446 B2 * | 1/2020 | DeFelice | ................ | G06N 3/084 |
| 2002/0116174 A1 * | 8/2002 | Lee | ...................... | G06K 9/6217 704/9 |
| 2007/0239638 A1 * | 10/2007 | Zhuang | ................ | G06K 9/6269 706/20 |
| 2010/0082606 A1 * | 4/2010 | Xu | ...................... | G06F 16/9535 707/723 |
| 2012/0310627 A1 * | 12/2012 | Qi | ........................... | G06F 40/30 704/9 |
| 2013/0325442 A1 * | 12/2013 | Dahlmeier | ........... | G06F 40/274 704/9 |
| 2014/0163963 A2 * | 6/2014 | Dahlmeier | ........... | G06F 40/253 704/9 |
| 2017/0308790 A1 * | 10/2017 | Nogueira dos Santos | ................... | G06N 3/0454 |
| 2018/0349477 A1 * | 12/2018 | Jaech | ................ | G06F 16/9535 |
| 2019/0095432 A1 * | 3/2019 | Xia | ...................... | G06K 9/627 |
| 2020/0042596 A1 * | 2/2020 | Ravi | ...................... | G06F 40/30 |

* cited by examiner

METHOD AND APPARATUS FOR BUILDING TEXT CLASSIFICATION MODEL, AND TEXT CLASSIFICATION METHOD AND APPARATUS

The present application claims the priority of Chinese Patent Application No. 201710882685.0, filed on Sep. 26, 2017, with the title of "Method and apparatus for building text classification model, and text classification method and apparatus". The disclosure of the above application is incorporated herein by reference in its entirety.

FIELD OF THE DISCLOSURE

The present disclosure relates to natural language processing technologies, and particularly to a method and apparatus for building a text classification model, and a text classification method and apparatus.

BACKGROUND OF THE DISCLOSURE

In the Internet era, automatic text classification methods are applied to aspects of the field of the Internet, including webpage classification, microblog emotion analysis, and user's comment mining. At present, text classification precision in wide fields already reaches a very high degree, but has certain drawbacks in classification in vertical fields such as medical field, legal field, and science and technology field. In the prior art, a single model is usually employed to classify texts. Already-existing models have their respective merits and demerits, for example, short text classification exhibits a poor classification effect, and undesirable robustness and generalization performance. Therefore, a very good classification effect usually cannot be achieved by applying a single model to text classification in the vertical fields.

SUMMARY OF THE DISCLOSURE

In view of the above, the present disclosure provides a method and apparatus for building a text classification model, and a text classification method and apparatus, to improve the text classification effect.

A technical solution employed by the present disclosure to solve the technical problem is to provide a method of building a text classification model, the method comprising: obtaining a training sample, wherein the training sample includes a text and a corresponding class; obtaining a vector matrix corresponding to the text, after performing word segmentation for the text based on an entity dictionary; using the vector matrix corresponding to the text and a class of the text to train a first classification model and a second classification model respectively; during the training process, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

According to a preferred embodiment of the present disclosure, the text classification model is used to classify a medical text.

According to a preferred embodiment of the present disclosure, a training target of the first classification model and the second classification model is to minimize the loss function of the text classification model.

According to a preferred embodiment of the present disclosure, the first classification model is a probability-based classification model.

According to a preferred embodiment of the present disclosure, the first classification model comprises a classification model combined based on a bidirectional length memory unit and a convolutional neural network.

According to a preferred embodiment of the present disclosure, the training the first classification model comprises: training the first classification model by regarding the text as input, and regarding the class of the text as output.

According to a preferred embodiment of the present disclosure, the second classification model is a similarity-based classification model.

According to a preferred embodiment of the present disclosure, the second classification model comprises a classification model based on a deep neural network.

According to a preferred embodiment of the present disclosure, the training the second classification model comprises: training the second classification model by regarding the text and expert's data corresponding to the class of the text as input, and regarding a similarity between the text and the expert's data as output.

According to a preferred embodiment of the present disclosure, the using a loss function of the first classification model and a loss function of the second classification model to obtain a loss function of the text classification model comprises: using a preset combination form to integrate the loss function of the first classification model and the loss function of the second classification model, to obtain the loss function of the text classification model.

A technical solution employed by the present disclosure to solve the technical problem is to provide an apparatus for building a text classification model, the apparatus comprising: a first obtaining unit configured to obtain a training sample, wherein the training sample includes a text and a corresponding class; a second obtaining unit configured to obtain a vector matrix corresponding to the text, after performing word segmentation for the text based on an entity dictionary; a training unit configured to use the vector matrix corresponding to the text and a class of the text to train a first classification model and a second classification model respectively; wherein during the training process, the training unit uses a loss function of the first classification model and a loss function of the second classification model to obtain a loss function of the text classification model, and uses the loss function of the text classification model to adjust parameters for the first classification model and the second classification model, to obtain the text classification model formed by the first classification model and the second classification model.

According to a preferred embodiment of the present disclosure, a target of the training unit upon training the first classification model and the second classification model is to minimize the loss function of the text classification model.

According to a preferred embodiment of the present disclosure, upon training the first classification model, the training unit specifically performs: training the first classification model by regarding the text as input, and regarding the class of the text as output.

According to a preferred embodiment of the present disclosure, upon training the second classification model, the training unit specifically performs: training the second classification model by regarding the text and expert's data corresponding to the class of the text as input, and regarding a similarity between the text and the expert's data as output.

According to a preferred embodiment of the present disclosure, upon using a loss function of the first classification model and a loss function of the second classification model to obtain a loss function of the text classification model, the training unit specifically performs: using a preset combination form to integrate the loss function of the first classification model and the loss function of the second classification model, to obtain the loss function of the text classification model.

A technical solution employed by the present disclosure to solve the technical problem is to provide a text classification method, the method comprising: obtaining a to-be-classified text; obtaining a vector matrix corresponding to the text, after performing word segmentation for the text based on an entity dictionary; inputting the vector matrix into a text classification model, and obtaining a classification result of the text according to output of the text classification model.

A technical solution employed by the present disclosure to solve the technical problem is to provide a text classification apparatus, the apparatus comprising: a third obtaining unit configured to obtain a to-be-classified text; a fourth obtaining unit configured to obtain a vector matrix corresponding to the text, after performing word segmentation for the text based on an entity dictionary; a classification unit configured to input the vector matrix into a text classification model, and obtain a classification result of the text according to output of the text classification model.

As can be seen from the above technical solutions, a newly-built loss function is used in the present disclosure to integrate two classification models to obtain the text classification model, thereby improving the text classification effect when the text classification model is used for text classification.

DETAILED DESCRIPTION OF PREFERRED EMBODIMENTS

The present disclosure will be described in detail in conjunction with figures and specific embodiments to make objectives, technical solutions and advantages of the present disclosure more apparent.

Terms used in embodiments of the present disclosure are only intended to describe specific embodiments, not to limit the present disclosure. Singular forms "a", "said" and "the" used in embodiments and claims of the present disclosure are also intended to include plural forms, unless other senses are clearly defined in the context.

It should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Depending on the context, the word "if" as used herein may be construed as "at the time when . . . " or "when . . . " or "responsive to determining" or "responsive to detecting". Similarly, depending on the context, phrases "if . . . is determined" or "if . . . (stated condition or event) is detected" may be construed as "when . . . is determined" or "responsive to determining" or "when (stated condition or event) is detected" or "responsive to detecting (stated condition or event)".

Figure 1:
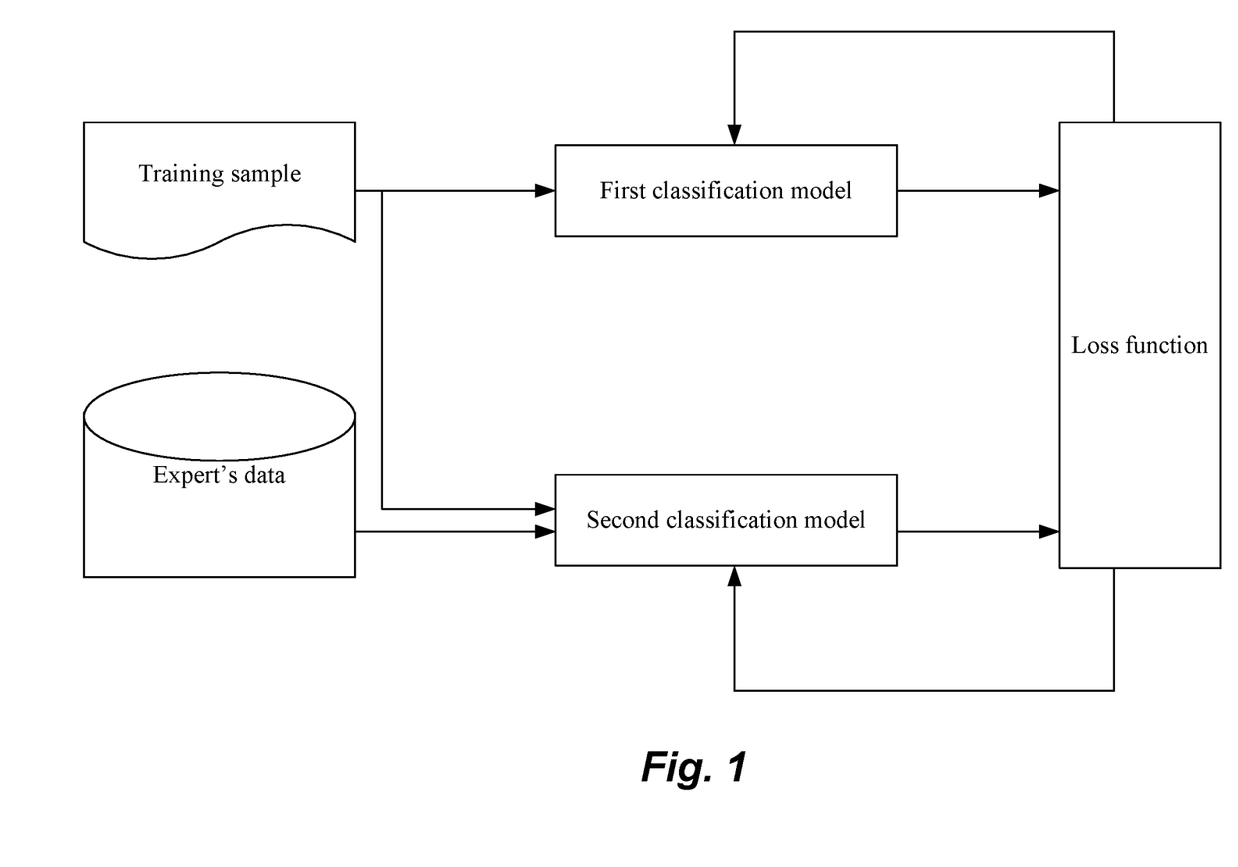
FIG. 1 is a structural diagram of building a text classification model according to an embodiment of the present disclosure.

A kernel idea of the present disclosure lies in, as shown in FIG. 1: creating a text classification model including a plurality of classification models, for classification of texts, and using a loss function formed by integration to train the plurality of classification models, so that the text classification model formed by the plurality of classification models can simultaneously consider a relevancy degree of the plurality of classification models; furthermore, introducing expert data during training so that the text classification model can classify text more accurately. The text classification model can be used in various vertical fields such as medical field, science and technology field and legal field. An example is taken in the present disclosure in which the text classification model is applied to the medical field.

First, a process of building the text classification model is built. In the present disclosure, the text classification model comprises a plurality of classification models, two, three or more classification models. Here, illustration is presented by taking an example in which two classification models form the text classification model.

Specifically, the text classification model may be obtained by employing the following training manner:

1) Obtaining a training sample, wherein the obtained training sample includes a text and a corresponding class.

In this step, a medical text included in the obtained training sample is a medical text already annotated with a class, namely, the class of the medical text can be obtained according to an annotation result of the medical text.

2) Obtaining a vector matrix corresponding to the text, after performing word segmentation for the text based on an entity dictionary.

In this step, it is feasible to first perform word segmentation for the text based on an entity dictionary, then perform word vectorization processing for word segmentation results, and finally join the obtained word vectors, thereby obtaining the vector matrix of the text.

The entity dictionary is a dictionary including technical terms in each field. In the embodiment, the used entity dictionary is a medical entity dictionary which includes technical terms of various medical entities, for example, names of various drugs, names of various diseases or name of various symptoms. Likewise, a science and technology entity dictionary includes technical terms of various science and technology entities, and a law dictionary includes technical terms of various legal entities. Therefore, in this step, performing word segmentation for the medical text based on the medical entity dictionary can effectively avoid the situation of wrong word segmentation for the medical text. This is because texts in different fields include technical terms in different fields, for example, the medical text includes very long or very complicated medicament names. When an ordinary word segmentation method is used, if a technical term cannot be distinguished, there might occur a situation in which an entire term is segmented into different sections.

Therefore, using the entity dictionary to segment the text in this step can ensure correct word segmentation processing for the text as much as possible.

It is feasible to, after performing word segmentation processing for the medical text, perform word vectorization processing for word segmentation results, namely, represent words as vectors by mapping words to vectors by a method such as Word2Vec or GloVe, and then join the obtained vectors, thereby obtaining a vector matrix corresponding to the medical text.

3) Using the vector matrix corresponding to the text and the class of the text to train a first classification model and a second classification model respectively.

First, a process of training the first classification model is described:

In this step, the first classification model is a probability-based classification model, which may include a classification model combined based on a bidirectional length memory unit and a convolutional neural network, or a classification model combined based on a bidirectional length memory unit and a deep neural network, or a classification model combined based on the convolutional neural network and the deep neural network.

When the first classification model is trained, the first classification model is trained by regarding the medical text as input and the class of the medical text as output. A training target of the first classification model is to minimize a loss function of the text classification model, and adjust parameters of the first classification model according to the loss function of the text classification model. The loss function of the text classification model will be described in detail below.

Then, a process of training the second classification model is described:

In this step, the second classification model is a similarity-based classification model, and it may include a deep neural network-based classification model or a convolutional neural network-based classification model.

When the second classification model is trained, the second classification model is trained by regarding the medical text and medical expert's data corresponding to the class of the medical text as input, and regarding a similarity between the medical text and the medical expert's data as output.

The expert's data is at least one of book, thesis and report related to technical fields. The medical expert's data used in this step is at least one of book, thesis and report in the medical field. In addition, expert's data in respective fields are pre-annotated with classes, i.e., the classes of the expert's data may be obtained from annotations. For example, in the medial expert's data, the medical expert's data annotated with "pharmacology" may include book A, report B and thesis C, and medical expert's data annotated with "department of respiration" may include book E and book F. This is because books, reports or theses in various technical fields all are compiled by experts in respective fields, and they include fine-granularity chapters and sections, abstract and introduction. It is possible to extract these fine-granularity chapters and sections, abstract and so on as classes annotated for expert's data in respective fields.

In addition, the medical expert's data used in this step and corresponding to the medical text is medical expert's data whose class is consistent with the class of the medical text. For example, if the class of a certain medical text is "pharmacology", the medical expert's data consistent with the medical text is book A, report B and thesis C, and its similarity annotation result is 1.

Consistent with the training target of the first classification model, a training target of the second classification model is to minimize a loss function of the text classification model, and adjust parameters of the second classification model according to the loss function.

4) During the training process, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

In this step, the loss functions used by the two models during training are first built:

Usually, different models adjust model parameters according loss functions they correspond to respectively. However, in text classification in the vertical fields, for example, on account of complexity of the medical text itself, an effect of using a single model to classify it is not good enough. Therefore, in the present disclosure, a new loss function is built to simultaneously supervise the training process of the two models, thereby improving the accuracy of text classification. It is feasible to use a preset combination form to integrate the loss functions of the first classification model and second classification model, to obtain the loss function of the text classification model.

In the present embodiment, assuming that the loss function of the first classification model is $Q_{cls}$; and the loss function of the second classification model is $Q_{match}$, the loss function Loss of the text classification model can be obtained by using the following equation:

$$Loss=G(Q_{cls}, Q_{match})$$

where Loss is the loss function of the text classification model, $Q_{cls}$ is the loss function of the first classification model, $Q_{match}$ is the loss function of the second classification model, and G is a combined form of the two loss functions.

Possible combination forms of the loss function of the text classification model, namely, possible existence forms of G, are listed below. It may be appreciated that the loss function of the text classification model is not limited to the combination forms listed below:

$$Loss=\lambda \cdot Q_{cls}+(1-\lambda) \cdot Q_{match} \text{ or;}$$

$$Loss=\lambda \cdot Q_{cls} \cdot Q_{match} \text{ or;}$$

$$Loss=\lambda \cdot Q^2_{cls}+(1-\lambda) \cdot Q^2_{match}$$

where Loss is the loss function of the text classification model, $Q_{cls}$ is the loss function of the first classification model, $Q_{match}$ is the loss function of the second classification model, and $\lambda$ is a weight parameter.

Therefore, the loss function used upon adjusting parameters of the first classification model and second classification model in the above step is Loss obtained from the above equation. Simultaneously using the loss function of the text classification model to adjust parameters of the first classification model and second classification model can make results obtained by the two models more accurate. This is because when the probability-based text classification model is used individually, a very good effect is achieved for coarse-granularity text classification, but there are problems with fine-granularity field classification because expert's data is not introduced as constraints; there are also defects when the similarity-based classification model is used individually. The model does not use plural labels of the text, and only uses binary labels (whether similar or not) for text classification, so that a recall rate of the model is lower.

For example, if the input text is the medical text which is a certain medical examination question, the class of the question obtained using the first classification model is "pharmacology", but it is known from the second classification model that the question is not similar to the medical expert's data in pharmacology, so it is impossible to judge which model's output is a correct result; however, when the class of the question obtained using the first classification model is "pharmacology" and it is known from the second classification model that the question is similar to the medical expert's data in pharmacology, it is possible to determine that the class of the medical text is "pharmacology". As a result, the two models are constrained by each other during training, the output classification results are consistent. This is also a purpose of using the same loss function to optimize the two models to obtain the text classification model.

Figure 2:
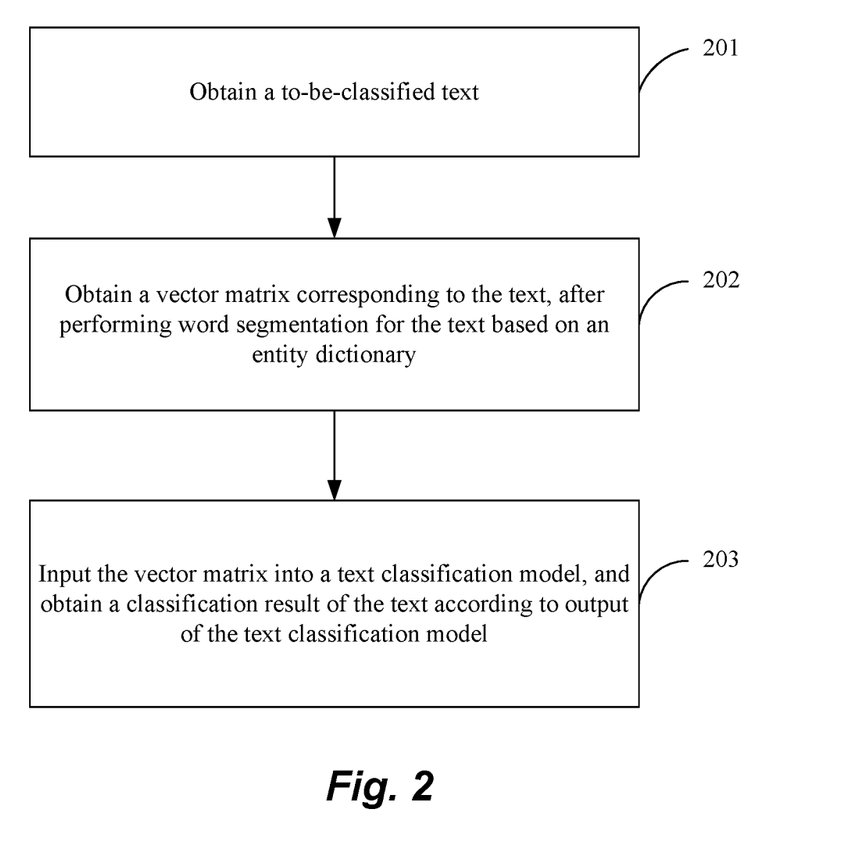
FIG. 2 is a flow chart of a text classification method according to an embodiment of the present disclosure.

FIG. 2 is a flow chart of a text classification method according to an embodiment of the present disclosure. As shown in FIG. 2, the method comprises:

At 201, obtain a to-be-classified text.

In this step, the obtained text may be a text in various fields such as medical science, science and technology, and law. The present disclosure is illustrated by taking an example in which the obtained to-be-classified text is a text in the medical field. For example, the obtained text may be a medical document, an electronic medical record text, or medical examination question.

At 202, obtain a vector matrix corresponding to the text, after performing word segmentation for the text based on an entity dictionary.

In this step, it is feasible to perform word segmentation for the medical text obtained from step 201, and obtain the vector matrix corresponding to the medical text, wherein performing word segmentation processing for the text based on an entity dictionary is performing word segmentation for the medical text based on the medical entity dictionary, then word vectorization processing is performed for word segmentation results, and finally the word vectors are joined to obtain the vector matrix of the medical text. The word segmentation processing, word vectorization processing and joining processing performed in this step are consistent with processing performed for the text in the training sample in the above step, and are not detailed any more here.

At 203, input the vector matrix into a text classification model, and obtain a classification result of the text according to output of the text classification model.

In this step, it is feasible to input the vector matrix corresponding to the medical text obtained in step 202 into the text classification model obtained by pre-training, and obtain the classification result of the medical text according to output of the text classification model.

Specifically speaking, the classification result of the medical text obtained by the text classification model in this step comprises two portions: one is a classification result of the medical text obtained by the first classification model, and the other portion is a similarity between the medical text and the medical expert's data corresponding to the class of the medical text as obtained by the second classification model.

Therefore, the above method can be used to implement more accurate classification for texts in different fields, and can be used to automatically sort out texts in different fields, for example, sort out medical documents, medical examination questions, interrogation information in electronic medical records; in addition, since expert's data is introduced during training the model, the present disclosure can be used to build indexes of expert's data in different fields according to the classification result, for example build indexes of medical expert's data for medical documents and medical examination questions.

Figure 3:
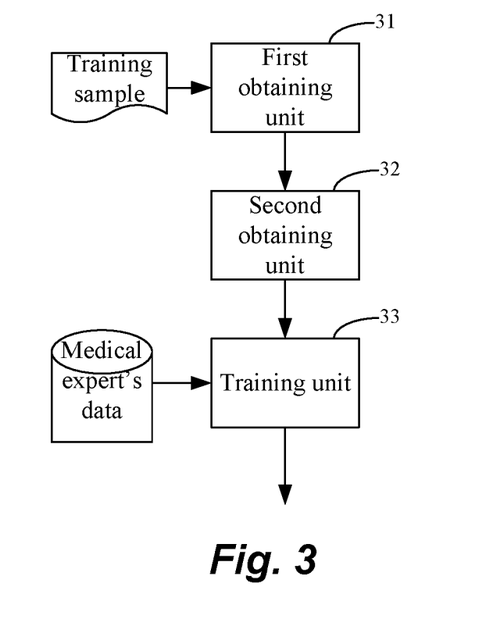
FIG. 3 is a structural diagram of an apparatus for building a text classification model according to an embodiment of the present disclosure.

FIG. 3 is a structural diagram of an apparatus for building a text classification model according to an embodiment of the present disclosure. As shown in FIG. 3, the apparatus comprises: a first obtaining unit 31, a second obtaining unit 32, and a training unit 33.

The first obtaining unit 31 is configured to obtain a training sample, wherein the training sample includes a text and a corresponding class.

A medical text included in the training sample obtained by the first obtaining unit 31 is a medical text already annotated with a class, namely, the class of the medical text can be obtained according to an annotation result of the medical text.

The second obtaining unit 32 is configured to obtain a vector matrix corresponding to the text, after performing word segmentation for the text based on an entity dictionary.

The second obtaining unit 32 first performs word segmentation processing for the text based on an entity dictionary, then performs word vectorization processing for word segmentation results, and finally joins the obtained word vectors, thereby obtaining the vector matrix of the text.

The entity dictionary is a dictionary including technical terms in each field. The entity dictionary used by the second obtaining unit 32 is a medical entity dictionary which includes technical terms of various medical entities, for example, names of various drugs, names of various diseases or name of various symptoms. Likewise, a science and technology entity dictionary includes technical terms of various science and technology entities, and a law dictionary includes technical terms of various legal entities.

The second obtaining unit 32 performs word segmentation for the medical text based on the medical entity dictionary, can effectively avoid the situation of wrong word segmentation for the medical text, and can ensure correct word segmentation processing for the text as much as possible.

After performing word segmentation processing for the medical text, the second obtaining unit 32 performs word vectorization processing for word segmentation results, namely, represent words as vectors by mapping words to vectors by a method such as Word2Vec or GloVe. Then, the second obtaining unit 32 joins the obtained vectors, thereby obtaining a vector matrix corresponding to the medical text.

The training unit 33 is configured to use the vector matrix corresponding to the text and the class of the text to train a first classification model and a second classification model respectively.

The training unit 33 comprises two training processes which will be described respectively:

(1) The training unit 33 may train the first classification model in the following manner:

The first classification model trained by the training unit 33 is a probability-based classification model, which may include a classification model combined based on a bidirectional length memory unit and a convolutional neural network, or a classification model combined based on a bidirectional length memory unit and a deep neural network, or a classification model combined based on the convolutional neural network and the deep neural network.

Upon training the first classification model, the training unit 33 trains the first classification model by regarding the medical text as input and the class of the medical text as output. A training target of the first classification model is to minimize a loss function of the text classification model. The loss function of the text classification model will be described in detail below.

(2) The training unit 33 may train the second classification model in the following manner:

The second classification model trained by the training unit 33 is a similarity-based classification model, and it may include a deep neural network-based classification model or a convolutional neural network-based classification model.

Upon training the second classification model, the training unit 33 trains the second classification model by regarding the medical text and medical expert's data corresponding to the class of the medical text as input, and regarding a similarity between the medical text and the medical expert's data as output.

The expert's data is at least one of book, thesis and report related to technical fields. Expert's data in respective fields are pre-annotated with classes, i.e., the classes of the expert's data may be obtained from annotations. This is because books, reports or theses in various technical fields all are compiled by experts in respective fields, and they include fine-granularity chapters and sections, abstract and introduction. It is possible to extract these fine-granularity chapters and sections, abstract and so on as classes annotated for expert's data in respective fields.

The medical expert's data used by the training unit 33 is at least one of book, thesis and report related to technical fields. For example, in the medial expert's data, the medical expert's data annotated with "pharmacology" may include book A, report B and thesis C, and medical expert's data annotated with "department of respiration" may include book E and book F.

In addition, the medical expert's data used by the training unit 33 and corresponding to the medical text is medical expert's data whose class is consistent with the class of the medical text. For example, if the class of a certain medical text is "pharmacology", the medical expert's data consistent with the medical text is book A, report B and thesis C, and its similarity annotation result is 1.

Consistent with the training target of the first classification model, a training target of the training unit 33 training the second classification model is to minimize a loss function of the text classification model.

During the training process, the training unit 33 uses a loss function of the first classification model and a loss function of the second classification model to obtain a loss function of the text classification model, and uses the loss function of the text classification model to adjust parameters for the first classification model and the second classification model, to obtain the text classification model formed by the first classification model and the second classification model.

The training unit 33 first builds the loss functions used by the two models during training.

The training unit 33 uses a preset combination form to integrate the loss functions of the first classification model and second classification model, to obtain the loss function of the text classification model. In the present embodiment, assuming that the loss function of the first classification model is $Q_{cls}$, and the loss function of the second classification model is $Q_{match}$, the training unit may obtain the loss function Loss of the text classification model by using the following equation:

$$Loss = G(Q_{cls}, Q_{match})$$

where Loss is the loss function of the text classification model, $Q_{cls}$ is the loss function of the first classification model, $Q_{match}$ is the loss function of the second classification model, and G is a combined form of the two loss functions.

Possible combination forms of the loss function of the text classification model, namely, possible existence forms of G, are listed below. It may be appreciated that the loss function of the text classification model is not limited to the combination forms listed below:

$$Loss = \lambda \cdot Q_{cls} + (1\lambda) \cdot Q_{match} \text{ or;}$$

$$Loss = \lambda \cdot Q_{cls} \cdot Q_{match} \text{ or;}$$

$$Loss = \lambda \cdot \lambda^2_{cls} + (1-\lambda) \cdot Q^2_{match}$$

where Loss is the loss function of the text classification model, $Q_{cls}$ is the loss function of the first classification model, $Q_{match}$ is the loss function of the second classification model, and $\lambda$ is a weight parameter.

Therefore, the loss function used by the training unit 33 upon adjusting parameters of the first classification model and second classification model in the above step is Loss obtained from the above equation. Upon completion of the training, the text classification model formed by the first classification model and second classification model is obtained, and the text classification model can be used to obtain more accurate text classification results.

Figure 4:
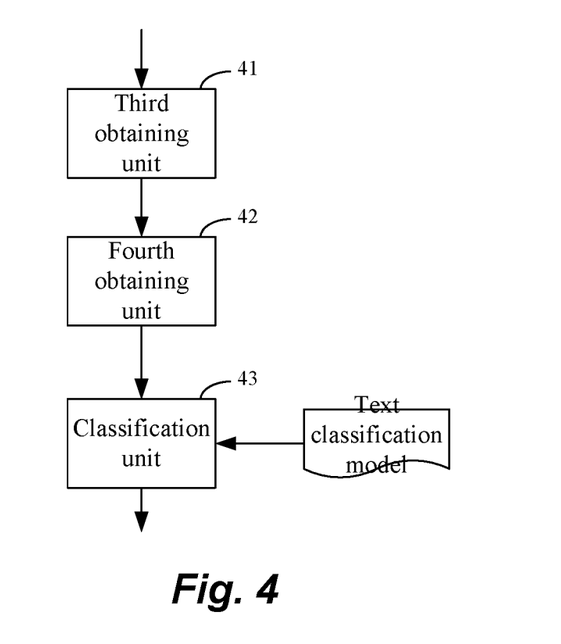
FIG. 4 is a structural diagram of a text classification apparatus according to an embodiment of the present disclosure.

FIG. 4 is a structural diagram of a text classification apparatus according to an embodiment of the present disclosure. As shown in FIG. 4, the apparatus comprises: a third obtaining unit 41, a fourth obtaining unit 42 and a classification unit 43.

The third obtaining unit 41 is configured to obtain a to-be-classified text.

The text obtained by the third obtaining unit 41 may be a text in various fields such as medical science, science and technology, and law. The present embodiment is illustrated by taking an example in which the obtained to-be-classified text is a text in the medical field. The text obtained by the third obtaining unit 41 may be a medical document, an electronic medical record text, or medical examination question.

The fourth obtaining unit 42 is configured to obtain a vector matrix corresponding to the text, after performing word segmentation for the text based on an entity dictionary.

The fourth obtaining unit 42 performs word segmentation for the medical text obtained by the third obtaining unit 41, and obtains the vector matrix corresponding to the medical text. Specifically, the fourth obtaining unit 42 performs word segmentation for the medical text based on the medical entity dictionary, then performs word vectorization processing for word segmentation results, and finally joins the word vectors to obtain the vector matrix of the medical text. The word segmentation processing, word vectorization processing and joining processing performed by the fourth obtaining unit 42 are consistent with processing performed by the second obtaining unit 32, and are not detailed any more here.

The classification unit 43 is configured to input the vector matrix into a text classification model, and obtain a classification result of the text according to output of the text classification model.

The classification unit 43 inputs the vector matrix corresponding to the medical text obtained by the fourth obtaining unit 42 into the text classification model obtained by pre-training, and obtains a classification result of the medical text according to output of the text classification model.

Specifically speaking, the classification result of the medical text obtained by the classification unit 43 comprises two portions: one is a classification result of the medical text obtained by the first classification model, and the other portion is a similarity between the medical text and the medical expert's data corresponding to the class of the medical text as obtained by the second classification model.

Figure 5:
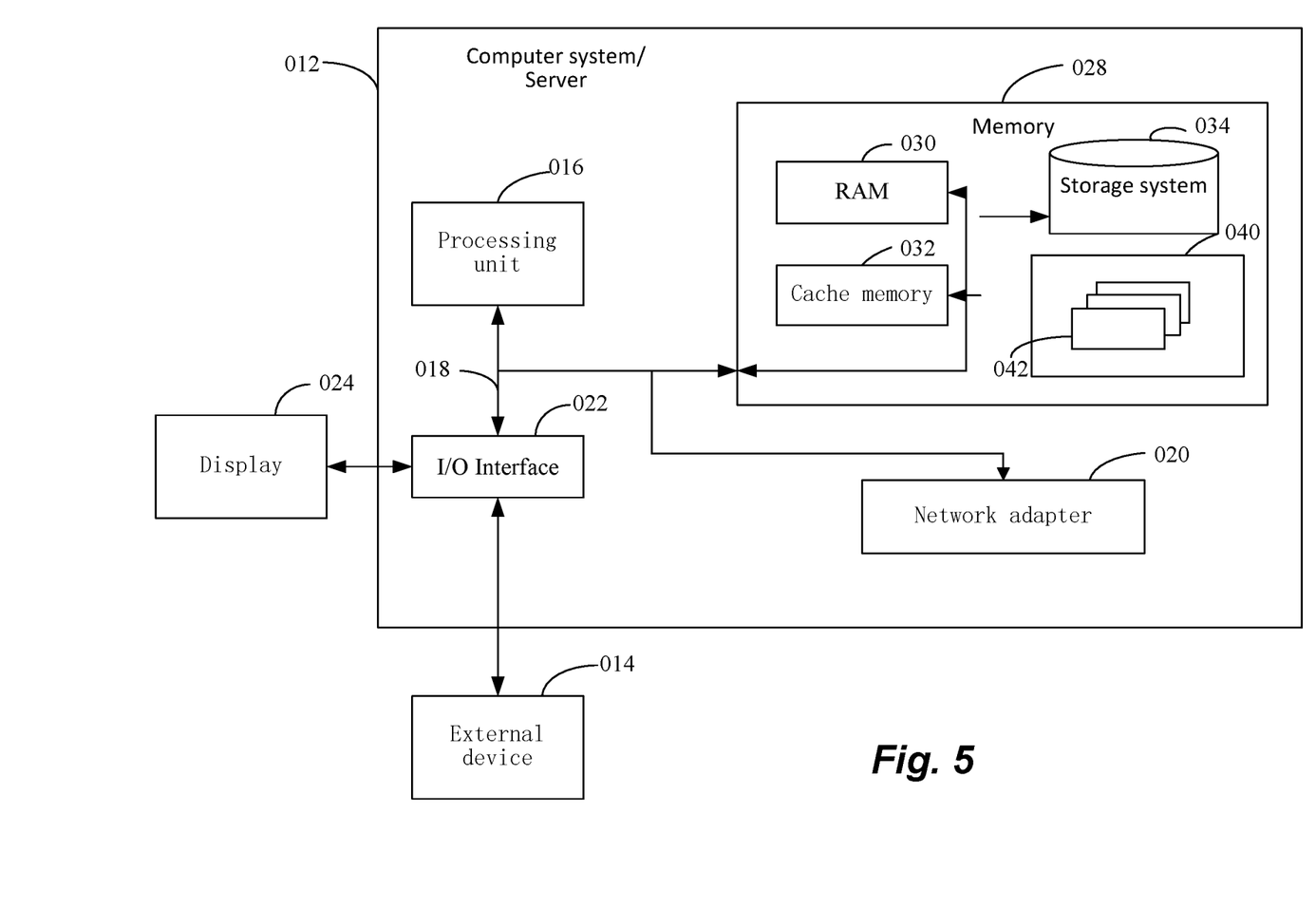
FIG. 5 is a block diagram of a computer system/server according to an embodiment of the present disclosure.

FIG. 5 illustrates a block diagram of an example computer system/server 012 adapted to implement an implementation mode of the present disclosure. The computer system/server 012 shown in FIG. 5 is only an example and should not bring about any limitation to the function and scope of use of the embodiments of the present disclosure.

As shown in FIG. 5, the computer system/server 012 is shown in the form of a general-purpose computing device. The components of computer system/server 012 may include, but are not limited to, one or more processors (processing units) 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 communicates with an external radar device, or with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via a network adapter 020. As depicted in the figure, network adapter 020 communicates with the other communication modules of computer system/server 012 via the bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the memory 028, for example, implement a method of building a text classification model, which may comprise:

obtaining a training sample, wherein the training sample includes a text and a corresponding class;

obtaining a vector matrix corresponding to the text, after performing word segmentation for the text based on an entity dictionary;

using the vector matrix corresponding to the text and the class of the text to train a first classification model and a second classification model respectively;

during the training process, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

Or for example implement a text classification method, which may comprise:

obtaining a to-be-classified text;

obtaining a vector matrix corresponding to the text, after performing word segmentation for the text based on an entity dictionary;

inputting the vector matrix into a text classification model, and obtaining a classification result of the text according to output of the text classification model.

The above-mentioned computer program may be set in a computer storage medium, i.e., the computer storage medium is encoded with a computer program. When the program, executed by one or more computers, enables said one or more computers to execute steps of methods and/or operations of apparatuses as shown in the above embodiments of the present disclosure. For example, steps of methods executed by said one or more processors may include:

obtaining a training sample, wherein the training sample includes a text and a corresponding class;

obtaining a vector matrix corresponding to the text, after performing word segmentation for the text based on an entity dictionary;

using the vector matrix corresponding to the text and the class of the text to train a first classification model and a second classification model respectively;

during the training process, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

Or may further comprise:

obtaining a to-be-classified text;

obtaining a vector matrix corresponding to the text, after performing word segmentation for the text based on an entity dictionary;

inputting the vector matrix into a text classification model, and obtaining a classification result of the text according to output of the text classification model.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a computer readable signal medium or a computer readable storage medium. A computer readable medium for example may include, but not limited to, an electronic, magnetic, optical, electromagnetic, infrared, or semiconductor system, apparatus, or device, or any suitable combination of the foregoing. More specific examples (non-exhaustive listing) of the computer readable storage medium would include an electrical connection having one or more conductor wires, a portable computer magnetic disk, a hard disk, a random access memory (RAM), a read-only memory (ROM), an erasable programmable read-only memory (EPROM or Flash memory), optical fiber, a portable compact disc read-only memory (CD-ROM), an optical storage device, a magnetic storage device, or any suitable combination of the foregoing. In the text herein, the computer readable storage medium can be any tangible medium that includes or stores a program. The program may be used by an instruction execution system, apparatus or device or used in conjunction therewith.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof. Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

With the technical solutions according to the present disclosure being used, a newly-built loss function is used to integrate two models to obtain a text classification model, thereby improving the text classification effect when the text classification model is used for text classification.

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure

What is claimed is:

1. A method of building a text classification model, wherein the method comprises:

obtaining a training sample, wherein the training sample includes a text and a corresponding class;

obtaining a vector matrix corresponding to the text, after performing word segmentation for the text based on an entity dictionary;

using the vector matrix corresponding to the text and a class of the text to train a first classification model and a second classification model respectively; and during the training, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

2. The method according to claim 1, wherein the text classification model is used to classify a medical text.

3. The method according to claim 1, wherein a training target of the first classification model and the second classification model is to minimize the loss function of the text classification model.

4. The method according to claim 1, wherein the first classification model is a probability-based classification model.

5. The method according to claim 4, wherein the first classification model comprises a classification model combined based on a bidirectional length memory unit and a convolutional neural network.

6. The method according to claim 4, wherein the training the first classification model comprises:
training the first classification model by regarding the text as input, and regarding the class of the text as output.

7. The method according to claim 1, wherein the second classification model is a similarity-based classification model.

8. The method according to claim 7, wherein the second classification model comprises a classification model based on a deep neural network.

9. The method according to claim 7, wherein the training the second classification model comprises: training the second classification model by regarding the text and expert's data corresponding to the class of the text as input, and regarding a similarity between the text and the expert's data as output.

10. The method according to claim 1, wherein the using a loss function of the first classification model and a loss function of the second classification model to obtain a loss function of the text classification model comprises:
using a preset combination form to integrate the loss function of the first classification model and the loss function of the second classification model, to obtain the loss function of the text classification model.

11. A text classification method, wherein the method comprises:
obtaining a to-be-classified text;
obtaining a vector matrix corresponding to the to-be-classified text, after performing word segmentation for the to-be-classified text based on an entity dictionary; and
inputting the vector matrix into a text classification model, and obtaining a classification result of the to-be-classified text according to output of the text classification model,
wherein the text classification model is pre-built according to a method of building the text classification model, wherein the method of building the text classification model comprises:
obtaining a training sample, wherein the training sample includes a text and a corresponding class;
obtaining a vector matrix corresponding to the text, after performing word segmentation for the text based on an entity dictionary;
using the vector matrix corresponding to the text and a class of the text to train a first classification model and a second classification model respectively; and
during the training, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

12. A device, wherein the device comprises:
one or more processors; and
a storage for storing one or more programs, wherein the one or more programs, when executed by said one or more processors, enable said one or more processors to implement a method of building a text classification model, wherein the method comprises:
obtaining a training sample, wherein the training sample includes a text and a corresponding class;
obtaining a vector matrix corresponding to the text, after performing word segmentation for the text based on an entity dictionary;
using the vector matrix corresponding to the text and a class of the text to train a first classification model and a second classification model respectively; and
during the training, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

13. The device according to claim 12, wherein the text classification model is used to classify a medical text.

14. The device according to claim 12, wherein a training target of the first classification model and the second classification model is to minimize the loss function of the text classification model.

15. The device according to claim 12, wherein the first classification model is a probability-based classification model.

16. The device according to claim 15, wherein the first classification model comprises a classification model combined based on a bidirectional length memory unit and a convolutional neural network.

17. The device according to claim 15, wherein the training the first classification model comprises:
training the first classification model by regarding the text as input, and regarding the class of the text as output.

18. A device, wherein the device comprises:
one or more processors; and
a storage for storing one or more programs, wherein the one or more programs, when executed by said one or more processors, enable said one or more processors to implement a text classification method, wherein the method comprises:
obtaining a to-be-classified text;
obtaining a vector matrix corresponding to the to-be-classified text, after performing word segmentation for the to-be-classified text based on an entity dictionary; and
inputting the vector matrix into a text classification model, and obtaining a classification result of the to-be-classified text according to output of the text classification model,
wherein the text classification model is pre-built according to a method of building the text classification model, wherein the method of building the text classification model comprises:

obtaining a training sample, wherein the training sample includes a text and a corresponding class;

obtaining a vector matrix corresponding to the text, after performing word segmentation for the text based on an entity dictionary;

using the vector matrix corresponding to the text and a class of the text to train a first classification model and a second classification model respectively; and during the training, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

19. A non-transitory computer-readable storage medium including computer executable instructions, wherein the computer executable instructions, when executed by a computer processor, implement a method of building a text classification model, wherein the method comprises:

obtaining a training sample, wherein the training sample includes a text and a corresponding class;

obtaining a vector matrix corresponding to the text, after performing word segmentation for the text based on an entity dictionary;

using the vector matrix corresponding to the text and a class of the text to train a first classification model and a second classification model respectively; and during the training, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

20. A non-transitory computer-readable storage medium including computer executable instructions, wherein the computer executable instructions, when executed by a computer processor, implement a text classification method, wherein the method comprises:

obtaining a to-be-classified text;

obtaining a vector matrix corresponding to the to-be-classified text, after performing word segmentation for the to-be-classified text based on an entity dictionary; and inputting the vector matrix into a text classification model, and obtaining a classification result of the to-be-classified text according to output of the text classification model, wherein the text classification model is pre-built according to a method of building the text classification model, wherein the method of building the text classification model comprises:

obtaining a training sample, wherein the training sample includes a text and a corresponding class;

obtaining a vector matrix corresponding to the text, after performing word segmentation for the text based on an entity dictionary;

using the vector matrix corresponding to the text and a class of the text to train a first classification model and a second classification model respectively; and during the training, using a loss function of the first classification model and a loss function of the second classification model to obtain a loss function of the text classification model, and using the loss function of the text classification model to adjust parameters for the first classification model and the second classification model, to obtain the text classification model formed by the first classification model and the second classification model.

\* \* \* \* \*